United States Patent
Chopping

(10) Patent No.: US 6,600,745 B1
(45) Date of Patent: *Jul. 29, 2003

(54) CELL ALIGNERS

(75) Inventor: Geoffrey Chopping, Wimborne (GB)

(73) Assignee: Marconi Communications Limited, Coventry (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,569
(22) PCT Filed: Jan. 17, 1997
(86) PCT No.: PCT/GB97/00160
§ 371 (c)(1),
(2), (4) Date: Sep. 29, 1998
(87) PCT Pub. No.: WO97/28621
PCT Pub. Date: Aug. 7, 1997

(30) Foreign Application Priority Data

Feb. 2, 1996 (GB) .............................. 9602078
Dec. 19, 1996 (GB) .............................. 9626386

(51) Int. Cl.⁷ .............................................. H04L 12/28
(52) U.S. Cl. ...................... 370/394; 370/395.1; 370/412
(58) Field of Search ....................... 369/60.01; 370/298, 370/904, 905, 912, 914, 412, 394, 395.1; 375/357

(56) References Cited

U.S. PATENT DOCUMENTS

| | | | | |
|---|---|---|---|---|
| 5,471,510 A | | 11/1995 | Renault et al. | |
| 5,497,371 A | * | 3/1996 | Ellis et al. | 370/412 |
| 5,761,203 A | * | 6/1998 | Morales | 370/418 |
| 5,790,171 A | * | 8/1998 | Klopfer et al. | 348/6 |
| 5,822,383 A | * | 10/1998 | Muntz et al. | 375/362 |
| 5,844,600 A | * | 12/1998 | Kerr | 348/17 |
| 5,896,427 A | * | 4/1999 | Muntz et al. | 375/372 |
| 5,943,339 A | * | 8/1999 | Mauger | 370/397 |
| 6,044,092 A | * | 3/2000 | Jayawardena et al. | 370/516 |

FOREIGN PATENT DOCUMENTS

EP 0 743 773 A2 11/1996
WO WO 95/22233 8/1995

OTHER PUBLICATIONS

Electronics & Communications in Japan, Part 1—Communications, vol. 76, No. 12, Dec. 1993, pp. 14–27, Hitoshi Uematsu, et al., "Cell Delay Variation Smoothing Methods For ATM–Based SDH Signal Transport System".

(List continued on next page.)

Primary Examiner—John Pezzlo
(74) Attorney, Agent, or Firm—Kirschstein, et al.

(57) ABSTRACT

An Asynchronous Transfer Mode (ATM) multiplexed data stream is terminated at a functional unit. Virtual channel data are being carried in cells in the data stream. A depacketizer has a plurality of cell buffers, each buffer storing the payload data contained in a single cell. The buffers are being loaded in sequence in accordance with a message sequence number carried by each cell and emptied in accordance with a depacketizer algorithm to form a non-continuous data stream. A fill-in cell format generator, on the failure of a valid cell to arrive, causes the replacement of the missing cell by a fill-in cell in the non-continuous data stream. A time-out function generator is started after each cell has been depacketized and sometimes after fill-in replacement cells have been generated.

2 Claims, 5 Drawing Sheets

OTHER PUBLICATIONS

Proceedings of Communications Systems: Towards Global Integrations, Singapore ICCS '90, Nov. 9, 1990, Singapore, pp. 8.6.1–8.6.5, Hessenmuller, H., et al., "*A Survey of Synchronization Aspects In A Broadband–ISDN Based on ATD*".

Protocols for High–Speed Network, II. Proceedings of the IFIP WG 6.1, WG 6.4 Second International Workshop, Nov. 29, 1990, Palo Alto, USA, pp. 353–367, Escobar J., et al., "*A Proposed Segmentation and Re–Assembly (SAR) Protocol For Use With Asynchronous Transfer Mode (ATM)*".

Electronics & Communications in Japan, Part 1—Communications, vol. 77, No. 6, Jun. 1, 1994, pp. 1–15, Hiromi Ueda, et al., "*SDH Signal Transfer Method Based on ATM Techniques*".

Electronics & Communications in Japan, Part 1—Communications, vol. 73, No. 5, May 1, 1990, pp. 99–108, Kitami T., *Synchronization Method Employing a Cyclic Redundance Check in an Asynchronous Transport System*.

ISS '95. World Telecommunications Congress. (International Switching Symposium), Advanced Switching Technologies for Universal Telecommunications at the Beginning of the $21^{st}$. Century Berlin,, Apr. 23–28, 1995, vol. 2, Apr. 23, 1995, Verband Deutscher Elektrotechniker (BDE), et al., pp. 403–407, Edmaier B., et al., "*Alignment Server For Hitless Path–Switching in ATM Networks*".

* cited by examiner

Fig. 4.

| | (n) | (n+1) | (n+2) | (n+3) | | 47 BYTE ADJUSTMENTS |
|---|---|---|---|---|---|---|
| A ⟶ | E | E | E | E | | RESTART IF 15ms TIMEOUT MATURES |
| FILL IN CELL | E | [E] | E | E | GO TO A | |
| | [F] | E | E | E | GO TO C | SLIP BACKWARD |
| | [F] | (F) | E | E | GO TO D | SLIP BACKWARD |
| | E | [(F)] | E | E | GO TO C | |
| | E | [(F)] | (F) | E | GO TO D | |
| B ⟶ | E | F | E | E | | |
| FILL IN CELL | E | [F] | E | E | GO TO C | |
| | E | [F] | (F) | E | GO TO D | |
| | E | [F] | (F) | (F) | GO TO F | |
| | E | [F] | E | (F) | GO TO E | |
| C ⟶ | F | E | E | E | | |
| DEPACKETISE CELL n | F→E | [E] | E | E | GO TO A | |
| | F→E | [(F)] | E | E | GO TO C | |
| | F→E | [(F)] | (F) | E | GO TO D | |
| | F→E | [E] | (F) | E | GO TO B | |
| D ⟶ | F | F | E | E | | |
| DEPACKETISE CELL n | F→E | [F] | E | E | GO TO C | |
| | F→E | [F] | (F) | E | GO TO D | |
| | F→E | [F] | (F) | (F) | GO TO F | |
| | F→E | [F] | E | (F) | GO TO E | |
| E ⟶ | F | E | F | E | | |
| DEPACKETISE CELL n | F→E | [E] | F | E | GO TO B | |
| | F→E | E | [F] | (F) | GO TO D | SLIP FORWARD |
| F ⟶ | F | F | F | E | | |
| DEPACKETISE CELL n | F→E | [F] | F | E | GO TO D | |
| | F→E | F | [E] | (F) | GO TO D | SLIP FORWARD CLEAR (n+1) |

Fig.5.

| | (n) | (n+1) | (n+2) | 23 BYTE ADJUSTMENTS | |
|---|---|---|---|---|---|
| A ⟶ | E | E | E | | |
| FILL IN CELL OR FILL IN OF 23 BYTES | E | E | E | GO TO A | RESTART IF 15ms TIMEOUT MATURES |
| | E | F | E | GO TO B | SLIP BACKWARD AFTER 23 BYTES |
| | E | F | E | GO TO B | |
| | E | F | F | GO TO D | |
| B ⟶ | F | E | E | | |
| DEPACKETISE CELL n | F→E | E | E | GO TO A | |
| | F→E | F | E | GO TO B | |
| | F→E | F | F | GO TO D | |
| | F→E | E | F | GO TO C | |
| C ⟶ | E | F | E | | |
| FILL IN CELL | E | F | E | GO TO B | |
| | E | F | F | GO TO E | SLIP FORWARD 23 BYTES |
| D ⟶ | F | F | E | | |
| DEPACKETISE CELL n | F→E | F | E | GO TO B | |
| | F→E | F | F | GO TO E | SLIP FORWARD 23 BYTES |
| E ⟶ | F | F | E | | |
| DEPACKETISE 24 BYTES OF CELL n | ½F→E | F | E | GO TO B | NO CELLS ACCEPTED DISCARD FIRST 23 BYTES |

Fig.6.

16 BYTE ADJUSTMENTS

| | (n) | (n+1)----(early) | | | |
|---|---|---|---|---|---|
| A ⟶ | E | E | | | |
| FILL IN CELL OR FILL IN OF 16 BYTES | E | E | - | GO TO A | RESTART IF 15ms TIMEOUT MATURES |
| | F | E | - | GO TO B | SLIP BACKWARD AFTER 16 BYTES |
| | E | F | N | GO TO B | |
| | E | F | Y | GO TO C | |
| B ⟶ | F | E | | | |
| DEPACKETISE CELL n | F→E | E | - | GO TO A | |
| | F→E | F | N | GO TO B | |
| | F→E | F | Y | GO TO C | |
| C ⟶ | F$_{early}$ | E | - | | |
| DEPACKETISE CELL n | F→E | E | - | GO TO A | |
| | F→E | F | N | GO TO B | |
| | F→E | F | Y | GO TO D | SLIP FORWARD 16 BYTES |
| D ⟶ | F$_{early}$ | E | - | | |
| DEPACKETISE 31 BYTES OF CELL n | 2/3 F→E | E | - | GO TO A | |
| | 2/3 F→E | F | N | GO TO B | NO EARLY CELLS ACCEPTED |
| | | | | | DISCARD FIRST 16 BYTES |

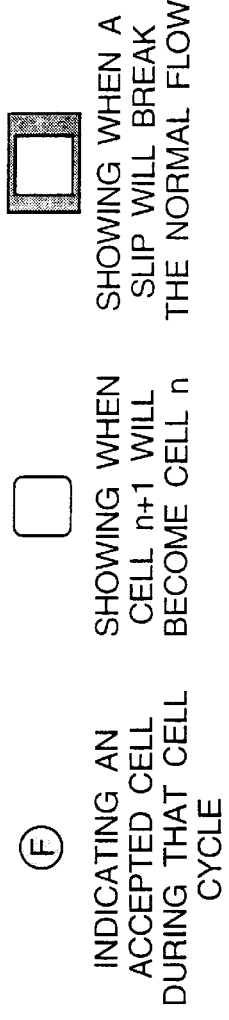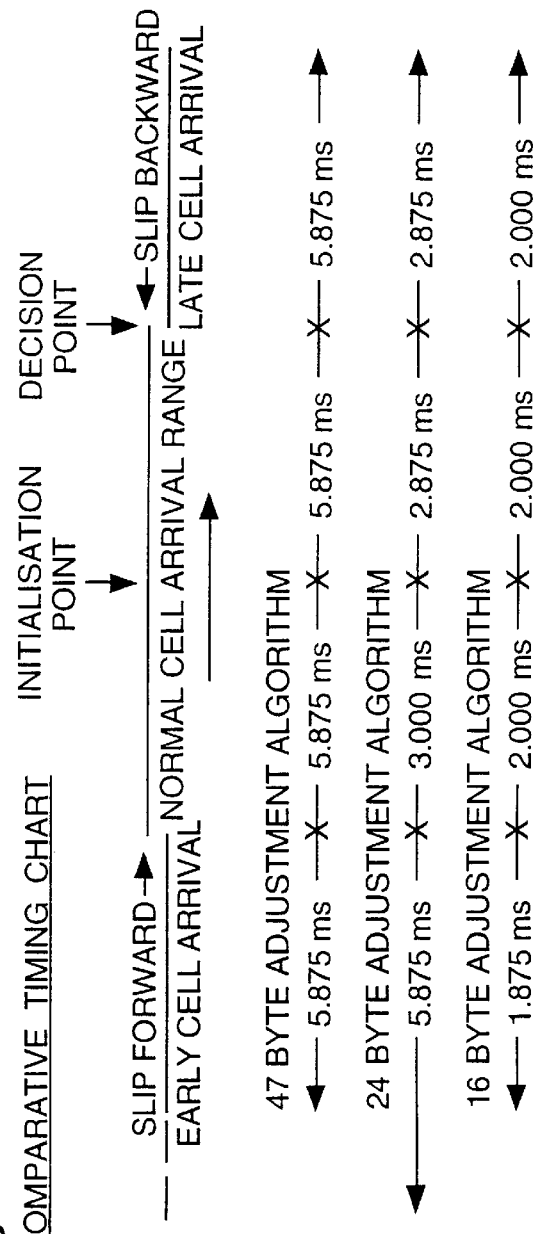

CELL ALIGNERS

BACKGROUND OF THE INVENTION

Aligners have been used when terminating a synchronous multiplex. such as a framed 2048 kbit/s link, onto a clocked functional unit, where the clock of the functional unit and the synchronous multiplex cannot be assumed to be of the same frequency and phase.

The use of aligners implies a synchronous service which will tolerate (although reluctantly) some slips. The design characteristic of an aligner is that if the limit of its buffering is reached then a controlled slip is performed. Aligners not only must be able to accept any phase of the incoming stream, but also must include sufficient hysteresis to cope with delay variations introduced by the network.

The use of aligners can also be extended to data carried by a cell based Asynchronous Transfer Mode (ATM) Virtual, Channel, so that traffic of a nominal constant bit rate can be transferred from an ATM multiplex onto functional units which are expecting traffic of the same nominal constant bit rate. Such a clocked functional unit could be a synchronous switch or a digital to analogue to decoder.

Asynchronous traffic is characterised by being carried in packets, frames or cells, cells being the term commonly used for ATM traffic. ATM cells are of a constant size and can carry a fixed amount of constant bit rate traffic data.

When an aligner slips it must miss out a fixed amount of data if the traffic is arriving too quickly. If the traffic is arriving too slowly, then either a fixed amount of data is repeated or a fixed substitution set of data is inserted.

A Virtual Channel ATM cell aligner described is suitable for cell streams where the cell delay variation is not greater than the average cell arrival rate of the cell stream. Consequently cell aligners are appropriate for low bit rate circuits such as 64 kbit/s.

SUMMARY OF THE INVENTION

According to the present invention there is provided a method of terminating an Asynchronous Transfer Mode (ATM) multiplexed data stream at a depacketising functional unit, where virtual channel data not including a frame alignment signal is carried in cells in the data stream, each of the cells having a message sequence number, the method comprising aligning the cells using a plurality of cell buffers each storing the payload data contained in a single cell, the cell buffers being sequentially identified in accordance with the lower significant bits of the message sequence number, conditionally loading an appropriately identified cell buffer with each cell from the data stream in accordance with the lower significant bits of the message sequence number provided the message sequence number does not correspond to the message sequence number of the cell buffer currently being depacketised and is not more than a pre-determined number M of message sequence numbers in advance of the cell buffer being depacketised or an empty cell buffer being replaced by a fill-in cell; and emptying the cell buffers according to the conditions of a combined depacketiser and slip algorithm to form a continuous data stream aligned to the clock and frame start signal of the depacketising functional unit; on the failure of a valid cell to arrive replacing the missing cell by a fill-in cell in the continuous data stream by means of a fill-in cell format generator; and employing a time-out function which is cleared and restarted after each valid cell is received in order to cause a restart of the combined depacketiser and slip algorithm if the time-out should mature.

Electronics and Communications in Japan; Part I Commnunications; 76 (1993) December, No. 12, New York, US pp 14–26 "Cell Delay Variation Smoothing Methods for ATM based SDH Signal Transport System Hitoshi Uematsu and Hironi Ueda describes where if the synchronous digital hierarchy (SDH) signal is converted into asynchronous transfer mode (ATM) cells to be transmitted through the ATM transport network, the efficiency of the operation/management/maintenance of the network will be improved in addition to maintaining the economy and reliability of the network. This is one of the advantages of the ATM transport network.

There is further considered the system where SDH signal is transported by ATM technique. The delay variation produced in the ATM transport network is evaluated. Then the buffer read-out control and the required buffer capacity are discussed. The order of processing between the delay variation smoothing function and other required functions in the proposed system is analysed.

The depacketiser contains sufficient cell buffers to handle the expected delay variation, 2 cell buffers for less than 2 millisecond and 4 cell buffers for up to 6 milliseconds of delay variation.

When a cell is loaded into a cell buffer within the depacketiser, a full/empty binary flag is set to full and the time-out is cleared and re-started. When a cell buffer has just finished being emptied, its full/empty binary flag is set to empty.

There is further provided a method of aligning one ATM Virtual Channel cell stream, of an ATM multiplex which includes a depacketiser wherein the combined depacketiser and slip algorithm is defined as: if on two successive occasions during the depacketisation of cell (n), or the generation of a fill-in cell to replace cell (n), the arrival of cell (n+M) occurs before B bytes of cell (n) have been depacketised, then the first S bytes of the next cell to be depacketised, or replaced by a fill-in cell, are discarded in order to introduce a forward slip of S bytes; otherwise if after the completion of the depacketisation of cell (n) or the generation of a fill-in cell to replace a missing cell (n), cell (n+1) has been received then cell (n+1) is fully depacketised and becomes the new cell (n); or if after the completion of the depacketisation of cell (n) or the generation of a fill-in cell to replace a missing cell (n), cell (n+1) has not been received then cell (n+1) is replaced by a fill-in cell and becomes the new cell (n); unless if within S byte periods of the starting of a fill-in cell to replace cell (n), the missing cell (n) is received, then a backward slip of S bytes is achieved by halting the fill-in cell after S bytes and depacketising the received cell (n).

When M=3. B=47 bytes and S=47 bytes;
When M=2. B=47 bytes and S=23 bytes;
When M=1. B=15 bytes and S=16 bytes.

BRIEF DESCRIPTION OF THE DRAWINGS

The present invention will now be described, by way of example, with reference to the accompanying drawings, in which:

FIG. 4 illustrates the combined depacketiser and slip algorithm for a 47 byte adjustment cell aligner;

FIG. 5 illustrates the combined depacketiser and slip algorithm for a 23 byte adjustment cell aligner;

FIG. 6 illustrates the combined depacketiser and slip algorithm for a 16 byte adjustment cell aligner;

FIG. 7 provides the key for FIGS. 4 to 6.

FIG. 8 shows a comparative timing chart for the algorithms of FIGS. 4 to 6.

DETAILED DESCRIPTION OF THE PREFERRED EMBODIMENTS

Figure 1:
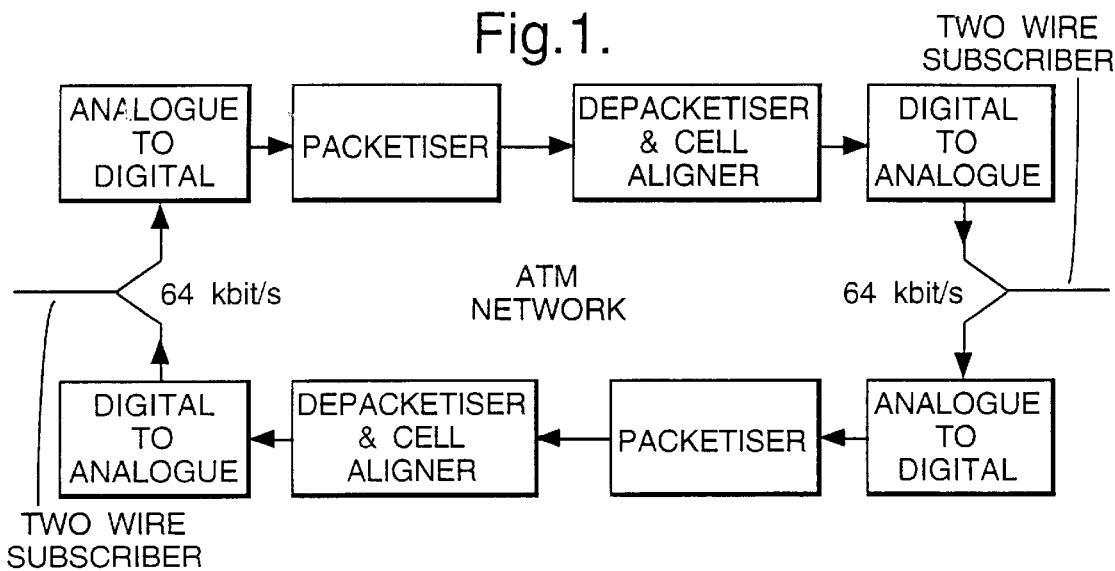
FIG. 1 shows a typical deployment of depacketiser and cell aligner functions; relative to packetisers, analogue to digital converters and digital to analogue converters.

The object of the present invention is to minimise the consequences of the extra delay and delay variation incurred by 64 kbit/s circuits when traversing Asynchronous Transfer Mode (ATM) networks as shown in FIG. 1.

The delay variation introduced to the 64 kbit/s circuits will be removed but at the expense of adding some further delay.

There are many cases where the external interface will have a common clock for more than one 64 kbit/s circuit (eg, 144 kbit/s ISDN links and 2 Mbit/s links) and therefore aligning techniques have to be used.

The unpacking of the 47 bytes of data from a cell will be performed using a cell aligner arrangement working to one of the combined depacketiser and slip algorithms shown in FIGS. 4, 5 and 6 depending on the Cell Delay Variation that has to be catered for.

In order to performance monitor a circuit across the network additional Operational and Maintenance (OAM) cells may also be occasionally sent across the network. This means the ATM network must be dimensioned to carry 128 kbit/s bursts of traffic without causing cell loss or exceeding the total network delay variation figure. The packetisation function must generate an ordinary cell (non OAM cell) regularly every 5.875 ms.

Consequently the total one way end to end network delay variation, even in the presence of OAM cells needs to be less than 5.8 ms, 2.8 ms or 1.8 ms, (depending on the combined depacketiser and slip algorithm used) if slips are to be avoided.

Slips are far more service affecting than corrupted data: especially for modem traffic, encrypted data and video coding. Consequently these combined depacketiser and slip algorithms aim to minimise the risks of slips occurring.

Slips can consist of the removal of 47 (23 or 16) bytes of data, or the addition of a fill-in sequence of 47 (23 or 16) bytes of data.

If a cell slip should occur, a further cell slip should not happen until a further phase shift of at least +or −5.8 ms (2.8 ms or 1.8 ms) has occurred.

If the local reference clock is not phase related to the original 64 kbit/s data source, then regular slips may occur. However, they will occur 47 (23 or 16) times less often than frame aligners as disclosed in Patent Numbers GB 2063624 and GB 2151437 corresponding to U.S. Pat. No. 4,368,531 and U.S. Pat. No. 4,617,659 respectively. The cell aligners ensure that unnecessary cell slips do not occur, whether due to initialisation, delayed cells, missing/corrupted cells or additional cells. The total loop delay added by the ATM Adaptation Functions, namely; packetisation, depacketisation and cell aligning functions, should in practice remain at a constant of approximately 24 ms (18 ms or 16 ms).

This extra adaptation delay value of 24 ms (18 ms or 16 ms) should apply for a synchronised network from initialisation until a break of at least 15 ms occurs, provided the delay variation figure of 5.8 ms (2.8 ms or 1.8 ms) is not exceeded.

The 24 ms (18 ms or 16 ms) of adaptation delay is in addition to the initial path loop delay; the initial path loop delay results from transmission propagation delays, transmission multiplexing delays, ATM switching delays, ATM buffering delays, analogue to digital and digital to analogue delays (if applicable) and private network delays (if applicable). The ATM switching and buffering delays being those ATM switching and buffering delays that delayed the first cell in each direction after a break.

The adaptation loop delay is mainly made up of a packetiser and depacketiser delays of 5.875 ms each way and each aligner having 5.875 ms (2.875 ms or 2.000 ms) worth of data in hand on initialisation. If cell slips occur because of a free running local reference then the loop delay can be increased or decreased by 5.875 ms (2.875 ms or 2.000 ms). If the delay variation exceeds 5.8 ms (2.8 ms or 1.8 ms) then both aligners could increase or decrease by 5.875 ms (2.875 ms or 2.000 ms).

Three compatible combined depacketiser and slip algorithms for the cell aligners are available to meet future network requirements.

Figure 2:
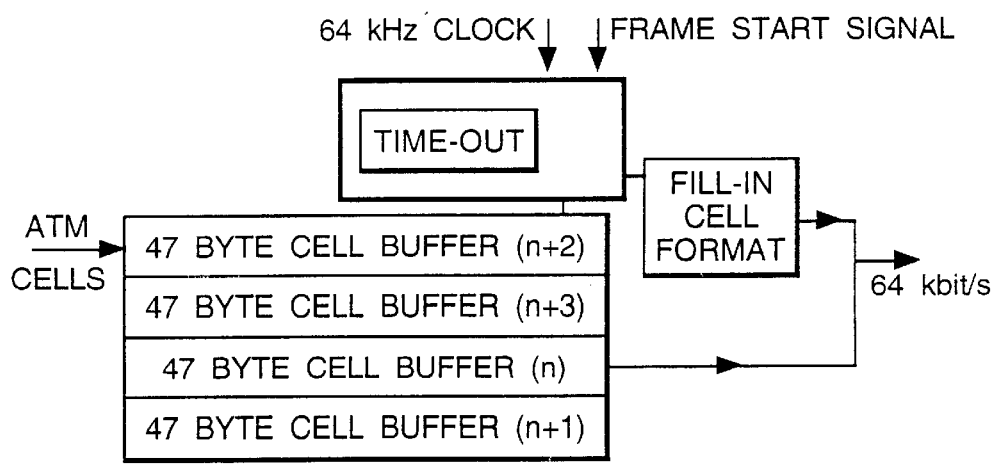
FIG. 2 illustrates a 47 (or 23) byte adjustment cell aligner.
Figure 3:
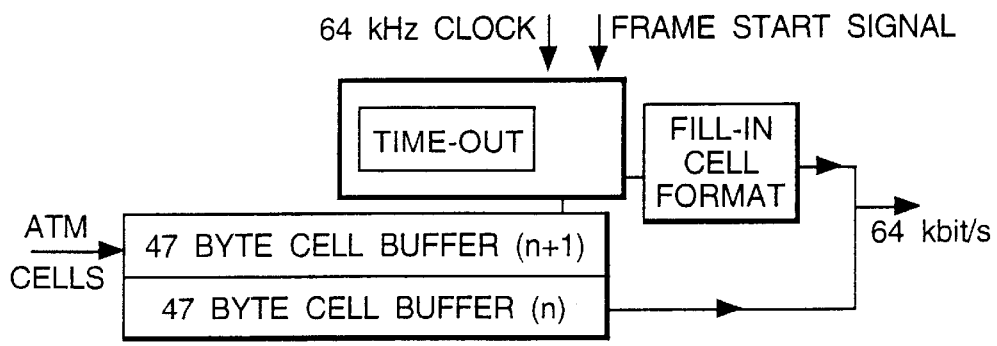
FIG. 3 illustrates a 16 byte adjustment cell aligner.

Normal additional constant loop delay is approximately:

24 ms for both ends using 47 byte adjustments as shown in FIG. 2;

18 ms for both ends using 23 byte adjustments as shown in FIG. 3;

16 ms for both ends using 16 byte adjustments as shown in FIG. 4;

an average value results if the two ends use different algorithms.

Any slips which occur introduce a phase shift of 5.875 ms or 2.875 ms or 2.000 ms depending on which algorithm is in use.

After initialisation there should be no slips, if the ATM Network Cell Delay Variation is less than 5.8 ms, 2.8 ms or 1.8 ms.

An ATM cell aligner containing 4 cell buffers, each of 47 bytes can be used for 47, 23 and 16 byte adjustment algorithms, as shown in FIGS. 2 and 3.

These algorithms have been designed to minimise the chance of cell slips. The algorithms initialise to the central position of the operational range of the buffer. They do not do individual byte slips, but do slips of 47 (23 or 16) bytes when really necessary.

Because the cell aligner initialises to its central position, this results in 24 ms (18 ms or 16 ms) of additional loop delay. On end to end network connections this additional delay should normally remain at that value, unless there is significant Cell Delay Variation.

The conditions for trying to initialise are that:

all the cell buffers are empty;

and that 2.5 nominal cell periods have elapsed (15 ms) since a valid cell was received. (A valid cell has to have an appropriate sequence number).

Once the "trying to initialise" state has occurred, if a cell is then received with any sequence number, it is accepted and after a wait of 5.875 ms (2.875 ms or 2.000 ms) then depacketisation starts.

The cell aligner with 4 cell buffers, as shown in FIG. 2, can be controlled so that it performs one of three algorithms which are defined by the three tables in FIGS. 4, 5 and 6 and the following explanatory notes.

A cell aligner with only 2 cell buffers, as shown in FIG. 3, can only operate the 16 byte adjustment algorithm defined by the table shown in FIG. 6.

When a cell is accepted into one of the four cell buffers it is written into the buffer which corresponds to the least significant 2 bits of the cell sequence number. Consequently four cell buffers are used even though only three are shown in the 23 byte adjustment table.

For the 16 byte adjustment algorithm, used by the cell aligners as shown in FIG. 3 the least significant bit of the cell sequence number is needed to define the cell buffer.

If a cell is to be depacketised then it is defined as cell n. Normally cell n+1 becomes the next cell n. A cell is depacketised during an internal cell cycle.

Cells are only accepted, if its cell sequence number satisfies the conditions specified in the table, the sequence number of the current cell n being known.

The fully empty states at the start of each internal cell cycle can be one of the A to F, (A to E) or (A to D) states shown.

For the 47 and 23 byte adjustment algorithms, during an internal cell cycle up to two cells, can be accepted for some of the full/empty states. If two are accepted then they must have arrived in the correct sequence.

The "go to" indication confirms the full/empty states for the start of the next internal cell cycle.

For the 16 byte adjustment algorithm an early cell is defined as a cell arriving when less than 15 bytes of the previous cell or fill in cell have been depacketised. If it arrives early by 5.875 ms (47 bytes) or more then it is rejected as being out of sequence.

What is claimed is:

1. A method of terminating an Asynchronous Transfer Mode (ATM) multiplexed data stream at a depacketizing functional unit, where virtual channel data not including a frame alignment signal is carried in cells in the data stream, each of the cells having a message sequence number, the method comprising the steps of:

a) aligning the cells using a plurality of cell buffers each storing payload data contained in a single cell, the cell buffers being sequentially identified in accordance with lower significant bits of the message sequence number;

b) conditionally loading an appropriately identified cell buffer with each cell from the data stream in accordance with the lower significant bits of the message sequence number, provided the message sequence number does not correspond to the message sequence number of the cell buffer currently being depacketized and is not more than the number of cell buffers minus one in advance of the message sequence number of the cell buffer being depacketized or an empty cell buffer being replaced by a fill-in cell;

c) emptying the cell buffers according to the conditions of a combined depacketizer and slip algorithm to form a continuous data stream aligned to clock and frame start signals of the depacketizing functional unit;

d) on the failure of a valid cell to arrive, replacing the missing cell by the fill-in cell in the continuous data stream by means of a fill-in cell format generator; and e) restarting the combined depacketizer and slip algorithm if a valid cell is not received.

2. In terminating an Asynchronous Transfer Mode (ATM) multiplexed data stream at a depacketizing functional unit, where virtual channel data not including a frame alignment signal is carried in cells in the data stream, each of the cells having a message sequence number, a cell aligner comprising:

a) means for aligning the cells using a plurality of cell buffers each storing payload data contained in a single cell, the cell buffers being sequentially identified in accordance with lower significant bits of the message sequence number;

b) means for conditionally loading an appropriately identified cell buffer with each cell from the data stream in accordance with the lower significant bits of the message sequence number, provided the message sequence number does not correspond to the message sequence number of the cell buffer currently being depacketized and is not more than the number of cell buffers minus one in advance of the message sequence number of the cell buffer being depacketized or an empty cell buffer being replaced by a fill-in cell;

c) means for emptying the cell buffers according to the conditions of a combined depacketizer and slip algorithm to form a continuous data stream aligned to clock and frame start signals of the depacketizing functional unit;

d) on the failure of a valid cell to arrive, a fill-in cell format generator means for replacing the missing cell by the fill-in cell in the continuous data stream; and e) means for restarting the combined depacketizer and slip algorithm if a valid cell is not received.

* * * * *